(12) United States Patent
Saund

(10) Patent No.: US 6,411,733 B1
(45) Date of Patent: Jun. 25, 2002

(54) METHOD AND APPARATUS FOR SEPARATING DOCUMENT IMAGE OBJECT TYPES

(75) Inventor: Eric Saund, San Carlos, CA (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/199,699

(22) Filed: Nov. 25, 1998

(51) Int. Cl.$^7$ .................................................. G06K 9/46
(52) U.S. Cl. ...................... 382/190; 382/200; 382/201; 382/258; 382/257
(58) Field of Search ................................ 382/181, 182, 382/183, 184, 185, 186, 187, 188, 189, 190, 191, 192, 200, 201, 258, 257, 256, 254

(56) References Cited

U.S. PATENT DOCUMENTS

| | | | |
|---|---|---|---|
| 4,093,941 A | * | 6/1978 | Bryan et al. ................ 382/197 |
| 4,520,505 A | | 5/1985 | Yamamoto et al. ........... 382/55 |
| 4,539,704 A | | 9/1985 | Pastor .......................... 382/55 |
| 4,574,357 A | | 3/1986 | Pastor et al. ................ 364/518 |
| 4,777,651 A | | 10/1988 | McCann et al. ............ 382/242 |
| 5,025,314 A | | 6/1991 | Tang et al. |
| 5,072,412 A | | 12/1991 | Henderson, Jr. et al. |
| 5,448,263 A | | 9/1995 | Martin |
| 5,583,949 A | * | 12/1996 | Simth et al. ................ 382/199 |
| 5,717,869 A | | 2/1998 | Moran et al. |
| 5,717,879 A | | 2/1998 | Moran et al. |
| 5,754,674 A | * | 5/1998 | Ott et al. .................... 382/112 |
| 5,778,092 A | * | 7/1998 | Macleod et al. ............ 382/176 |
| 5,786,814 A | | 7/1998 | Moran et al. |
| 5,907,842 A | * | 5/1999 | Mennemeier et al. ......... 707/7 |
| 5,940,538 A | | 8/1999 | Spiegel et al. .............. 382/236 |
| 5,970,170 A | * | 10/1999 | Kadashevich et al. ...... 382/187 |
| 5,978,511 A | | 11/1999 | Horiuchi et al. ............ 382/241 |

OTHER PUBLICATIONS

F. Y. Shih and W–T. Wong, "A New Safe–Point Thinning Algorithm Based on the Mid–Crack Code Tracing", *IEEE Trans. on Systems, Man, and Cybernetics*, vol. 25, No. 2, pp. 370–378 (Feb. 1995).

* cited by examiner

Primary Examiner—Bhavesh Mehta
Assistant Examiner—Ali Bayat
(74) Attorney, Agent, or Firm—Fay, Sharpe, Fagan, Minnich & McKee, LLP

(57) ABSTRACT

A method and apparatus is provided for segmenting a binary document image so as to assign image objects to one of three types: CHARACTER-type objects, STROKE-type objects, and LARGE-BITMAP-type objects. The method makes use of a contour tracing technique, statistical analysis of contour features, a thinning technique, and image morphology.

22 Claims, 17 Drawing Sheets

INCOMING
DIRECTION - 0

INCOMING
DIRECTION - 0

INCOMING
DIRECTION - 0

INCOMING
DIRECTION - 1

INCOMING
DIRECTION - 1

INCOMING
DIRECTION - 1

INCOMING
DIRECTION - 1

INCOMING
DIRECTION - 1

INCOMING
DIRECTION - 1

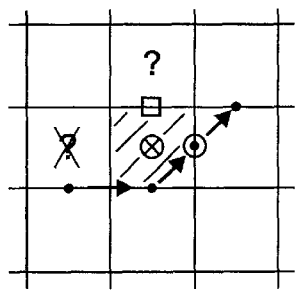
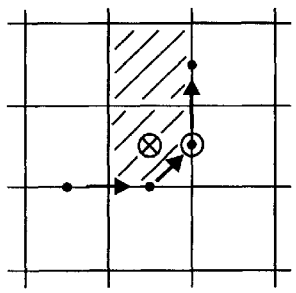
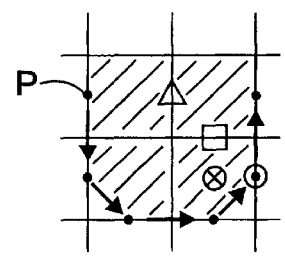
FIG. 11(a)  FIG. 11(b)  FIG. 11(c)
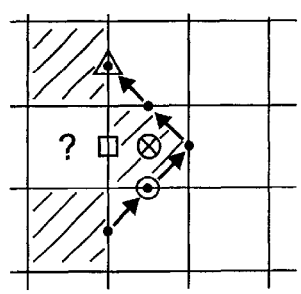
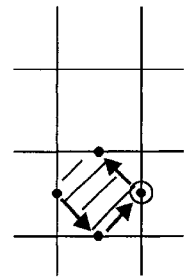
FIG. 11(d)  FIG. 11(e)
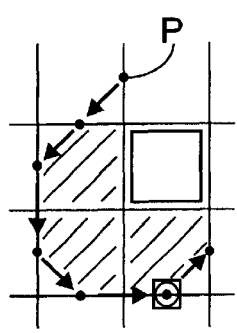
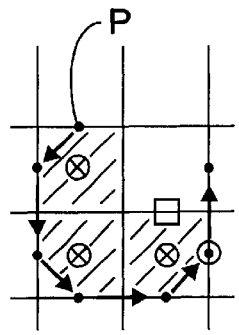
FIG. 11(f)  FIG. 11(g)

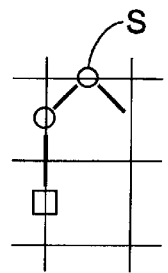
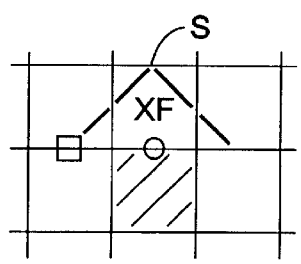
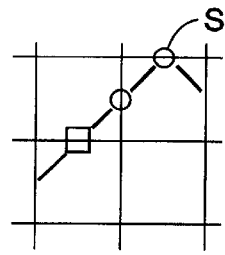
FIG. 12(a)   FIG. 12(b)   FIG. 12(c)
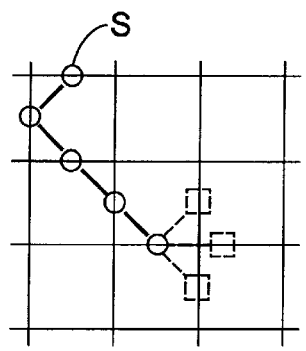
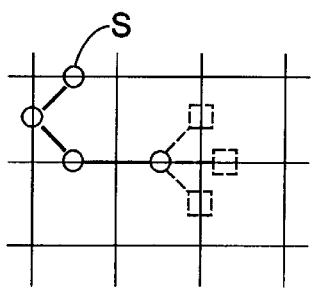
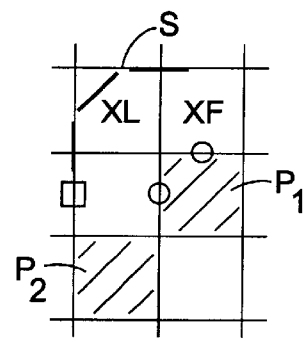
FIG. 12(d)   FIG. 12(e)   FIG. 12(f)

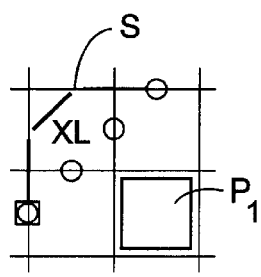
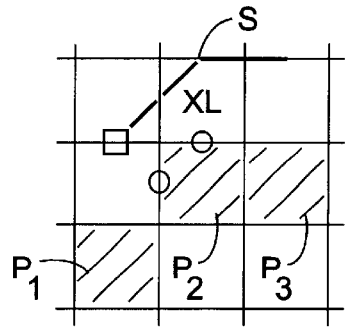
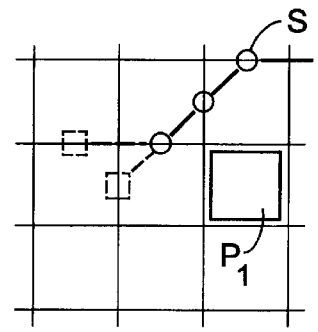
FIG. 12(g)      FIG. 12(h)      FIG. 12(i)
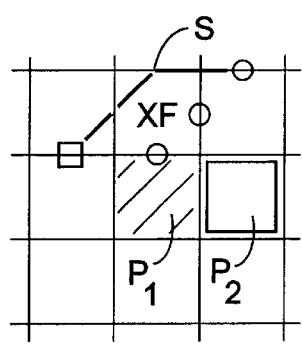
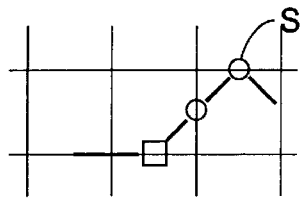
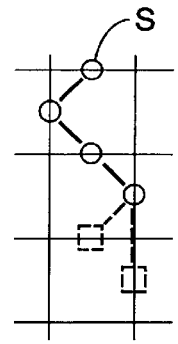
FIG. 12(j)      FIG. 12(k)      FIG. 12(l)
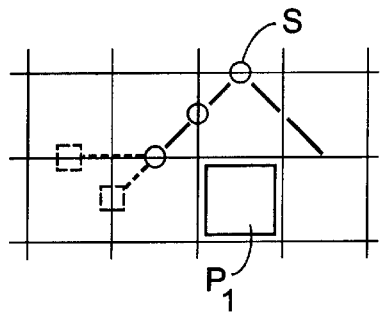
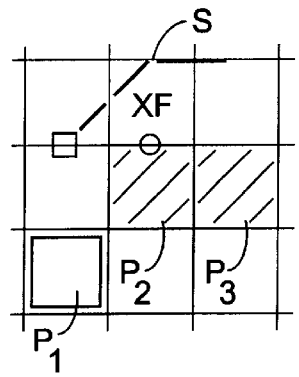
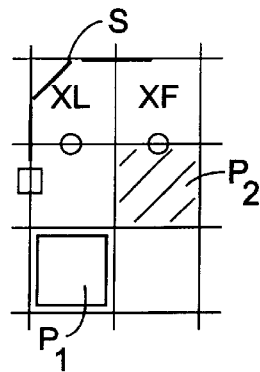
FIG. 12(m)      FIG. 12(n)      FIG. 12(o)

METHOD AND APPARATUS FOR SEPARATING DOCUMENT IMAGE OBJECT TYPES

CROSS REFERENCE TO RELATED APPLICATION

This application is related to U.S. application Ser. No. 09/200,187, filed on the same date as this application entitled "Method and Apparatus for Extracting the Skeleton of a Binary Figure by Contour-Based Erosion" by inventor Eric Saund, which is incorporated herein by this reference.

BACKGROUND OF THE INVENTION

This invention relates to a method and apparatus for processing images having different object types. More particularly, the invention is directed to a method implemented in a system for separating character-type objects, stroke-type objects and large bitmap (or blob) type objects in a binary document image. The invention makes use of contour tracing techniques, statistical analysis of contour features, thinning techniques and image morphology.

While the invention is particularly directed to the art of image processing and object separation, and will thus be described with specific reference thereto, it will be appreciated that the invention may have usefulness in other fields and applications.

Document images are fundamentally comprised of different colored picture elements (pixels). However, most of the known useful computational tools for accessing, transmitting, editing, displaying, and working with textual or semantic content require that image objects be represented in symbolic form.

In this regard, different symbolic representations exist for different types of image objects. For example, ASCII characters are useful for representing English text. Typically, text is converted to the ASCII character representation via Optical Character Recognition. In addition, chain-codes have been used successfully for representing curvilinear lines and unanalyzed bitmaps provide a satisfactory mechanism for representing complex or large objects or regions for which no shape model is given.

Certain software packages used for image processing, including the programs used with electronic interactive display boards such as the Tivoli/Meetingboard electronic whiteboard, maintain a data type for each of these types of image objects. When using such a program at an electronic interactive display board or workstation, stroke type objects are entered by freehand sketching, while character objects are entered by typing at the keyboard. Performing online OCR on pen input may also be possible. Currently, data can also be imported from bitmap images such as that obtained from a scanned image of a physical document, but these are treated only as unanalyzed bitmaps. The character and stroke data on them are not converted to editable character objects and stroke objects. This presents a difficulty if the objects require editing.

Some known methods for image processing simply classify connected components of an input bitmap. Others only apply image morphology operations to the input bitmap.

The present invention provides a new and improved image processing run method for separating object types which overcomes the above noted problems and difficulties and others. The method may be applied to any process where object type separation and editing is desired.

SUMMARY OF THE INVENTION

A method and apparatus for separating types of objects present in an image are provided. In one aspect of the invention, a method comprises the steps of inputting the image having objects including character type objects, stroke type objects and blob type objects, generating a first bitmap representing the image, determining which of the objects of the image are of the character type by comparing predetermined decision criteria to data obtained from the first bitmap, separating character type objects from the first bitmap to obtain a second bitmap, having only characters represented therein, and a third bitmap, and separating stroke type objects and blob type objects of the image, respectively, by selectively using techniques of thinning, dilation, and bitwise logical operations on at least one of the first and third bitmaps.

In another aspect of the invention, the method comprises performing N−1 thinning steps on the third bitmap to obtain a fourth bitmap, copying the fourth bitmap to obtain a fifth bitmap, performing another thinning step on the fourth bitmap, removing all non-interior pixels of the fifth bitmap to obtain a sixth bitmap, performing an image morphology based dilation on the sixth bitmap to restore pixels eroded by the thinning and removing steps and obtain a seventh bitmap, performing a bitwise boolean operation between the first bitmap and the seventh bitmap to obtain an eighth bitmap having only blob type objects represented therein, performing a bitwise boolean operation between the fourth bitmap and the eighth bitmap to obtain a ninth bitmap, and performing a tracing operation on the ninth bitmap to obtain a tenth bitmap having only stroke type objects represented therein.

In another aspect of the invention, the method further comprises obtaining a character type representation based on the second bitmap.

In another aspect of the invention, the method further comprises obtaining a blob type representation based on the eighth bitmap.

In another aspect of the invention, the method further comprises obtaining a stroke type representation based on the tenth bitmap.

In another aspect of the invention, a system is provided to implement the method.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device and steps of the method, whereby the objects contemplated are obtained as hereinafter more fully set forth, specifically pointed out in the claims, and illustrated in the accompanying drawings in which:

FIGS. 11(*a*)–11(*g*) illustrate exceptions to the path displacement rules;

FIGS. 12(*a*)–12(*o*) illustrate a catalog of starting configurations for non-whole figures;

DETAILED DESCRIPTION OF THE PREFERRED EMBODIMENTS

Figure 1A:
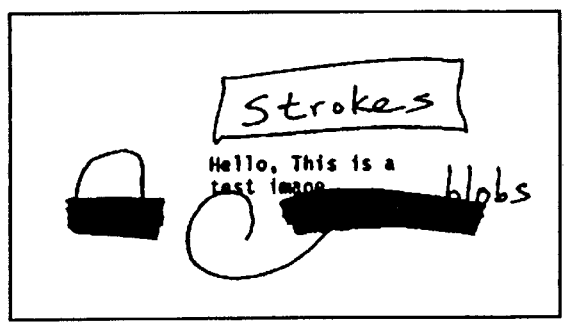
FIGS. 1(a)–(d) illustrate an example of an application of the present invention.
Figure 1B:
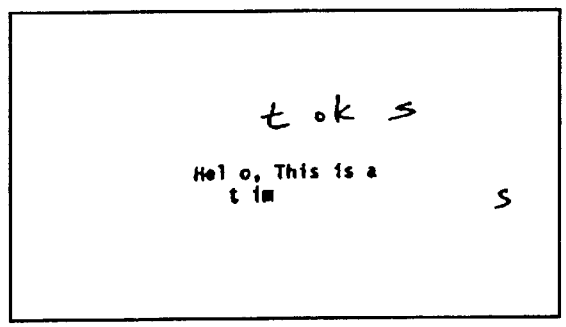
Figure 1C:
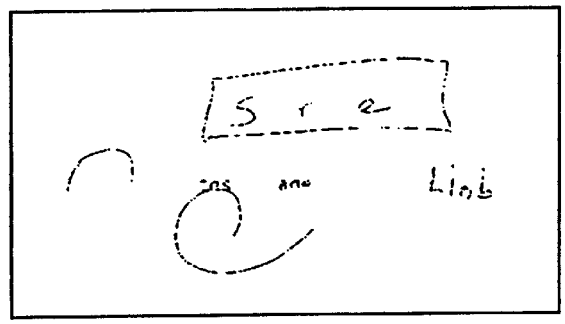
Figure 1D:
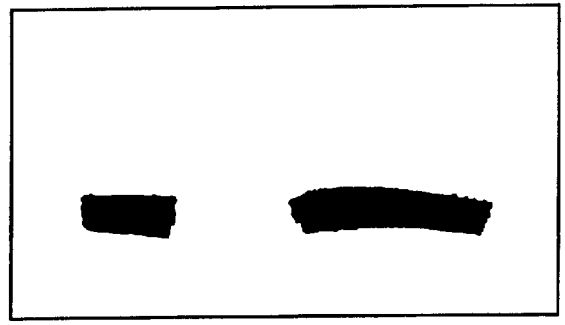
Figure 2A:
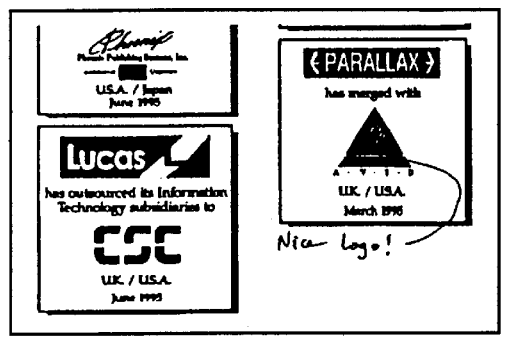
FIGS. 2(a)–(d) illustrate another example of an application of the present invention.
Figure 2B:
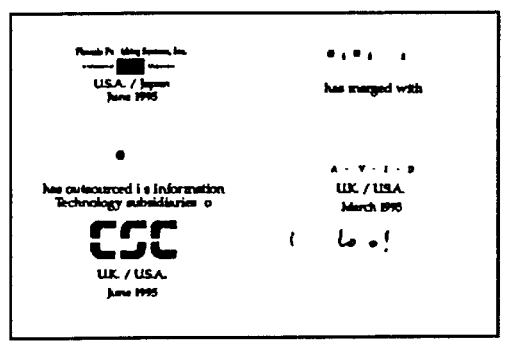
Figure 2C:
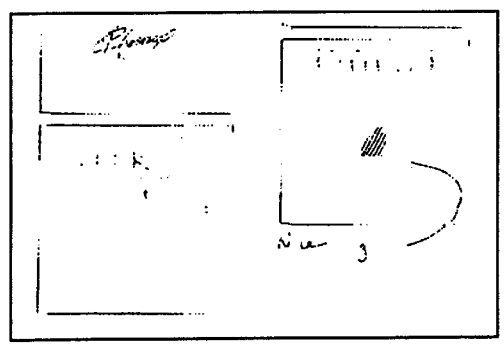
Figure 2D:
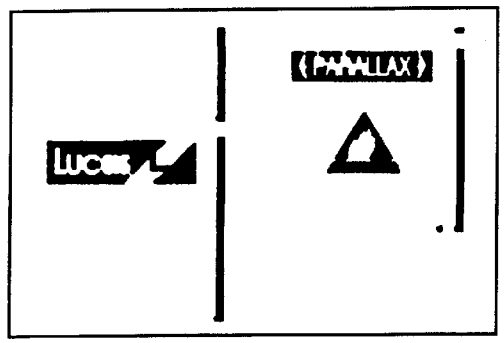

This invention is directed to a fast and efficient method and corresponding system for separating image objects of a binary image into CHARACTER type objects. STROKE type objects, and LARGE-BITMAP or BLOB type objects. Typically, image objects classified as CHARACTER type objects are single connected components in an input image so such objects are identifiable and separable. The present method is an improvement over known object separation methods because it also decomposes non-character objects into large "blob" areas and thin strokes, even when the strokes are connected to the blobs.

Although the preferred embodiment finds particular application in converting a scanned image, or bitmap, to electronic interactive display board characters, strokes, and bitmaps for editing, the method could be used in any setting in which it is useful to separate image objects into these types. For example, this technique would be useful in a token-based image compression scheme in which character data is efficiently encoded as instances of character templates, but curvilinear line data would be better encoded as a chain code.

Referring now to the drawings wherein the showings are for purposes of illustrating the preferred embodiments of the invention only and not for purposes of limiting same, FIGS. 1(*a*)–(*d*) show an example of an application of the overall preferred embodiment. As shown, FIG. 1(*a*) is an illustration of an input image. It should be recognized that when an image is scanned into a system, such as the exemplary system described herein in connection with FIG. 16, the image is transformed into a bitmap that corresponds to a pixel array. For ease of reference, the term "image" may be used interchangeably herein to refer to both the original image and the scanned image or resulting bitmap. FIGS. 1(*b*), (*c*), and (*d*) show the separated character, stroke and blob object images (or bitmaps), respectively, that result from an application of the present invention.

Likewise, FIGS. 2(*a*)(*d*) show another example of an application of the overall preferred embodiment. FIG. 2(*a*) is an illustration of the input image while FIGS. 2(*b*), (*c*) and (*d*) are the resultant character, stroke, and blob object images that are respectively generated as a result of the application or the present invention.

Figure 3:
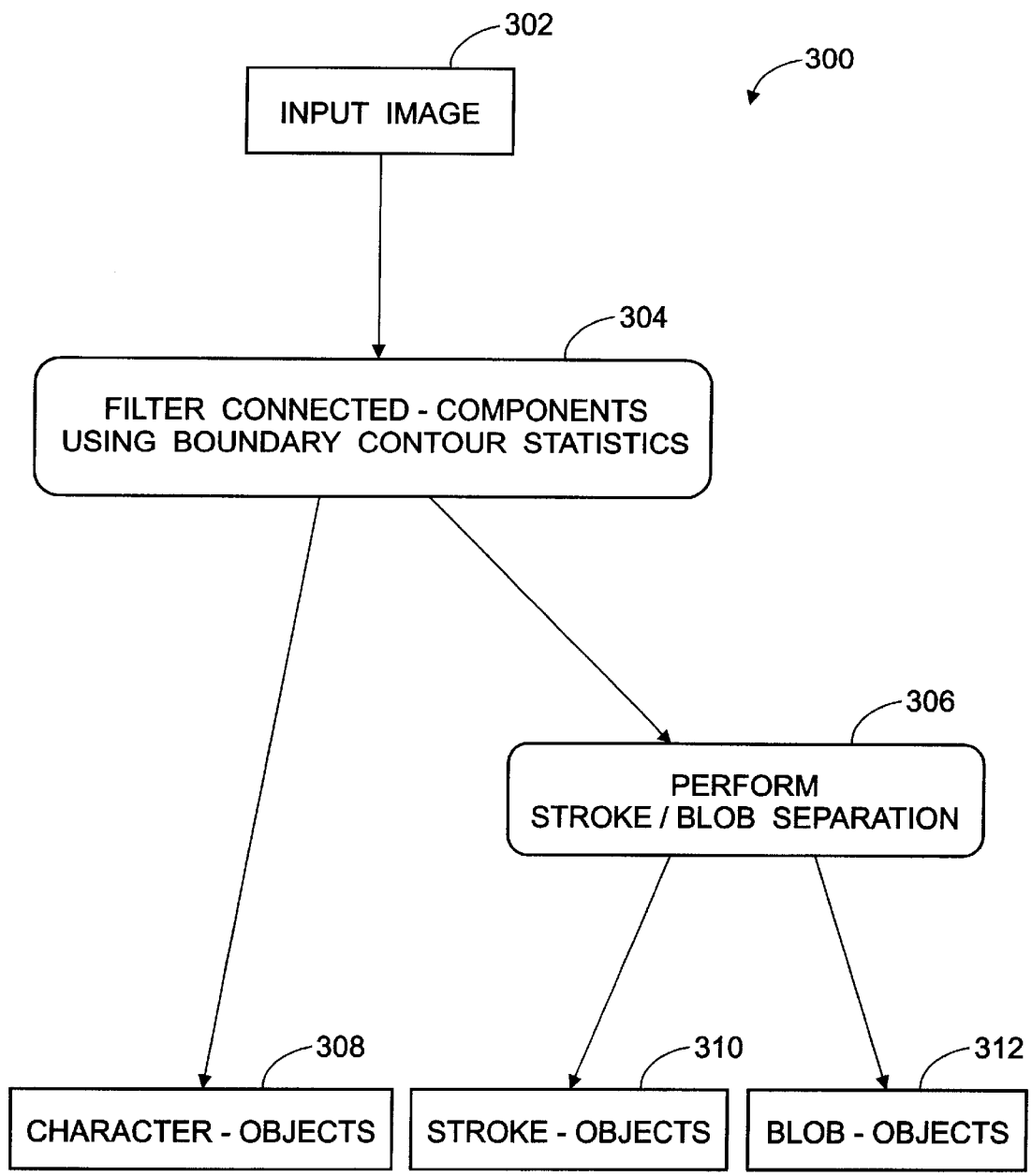
FIG. 3 is a flowchart of the method according to the present invention.

In FIG. 3, the image object separation procedure 300 is illustrated. First, an image is input in the form of a bitmap (step 302). Image objects arc classified as either character or non-character on a connected-component by connected-component basis by filtering using boundary contour statistics (step 304). Non-character objects are then processed using thinning and morphology to separate thin stroke objects from thick blobular objects, as will be described in more detail in connection with FIG. 7 (step 306). It is to be appreciated that once objects are classified as character, stroke, or blob and separated into respective bitmaps (steps 308, 310, 312), a variety of processes could be applied to the resultant bitmaps or images. As noted above, the method is particularly useful in electronic interactive display board applications where editing of the input image is desired. However, the resultant images could be processed in any suitable manner.

With reference to step 304, in order to minimize processing requirements, image objects are treated as chain-coded boundary contour representations. A mid-crack boundary representation described in more detail below—which supports both measurement of contour statistics for determining whether an object is a character and an erosion-based shape thinning or skeletonization for performing stroke/blob separation—is implemented.

Figure 4A:
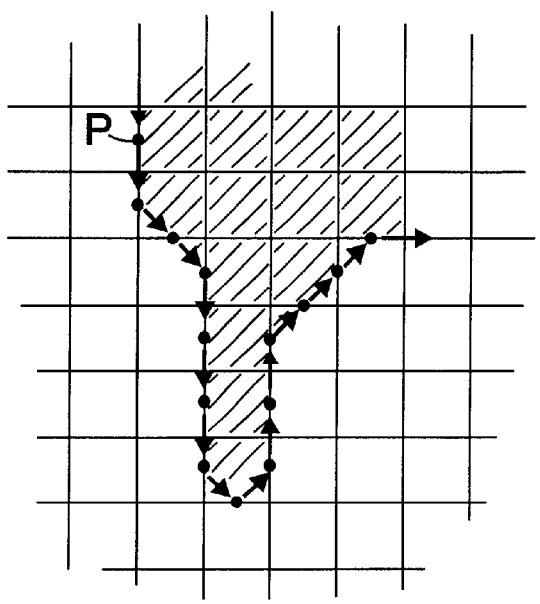
FIGS. 4(a)–(c) illustrate contour encoding according to the present invention.
Figure 4C:
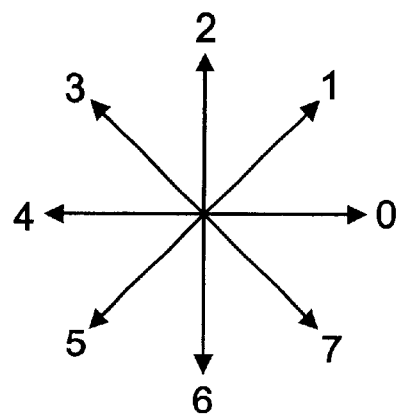
Figure 4B:
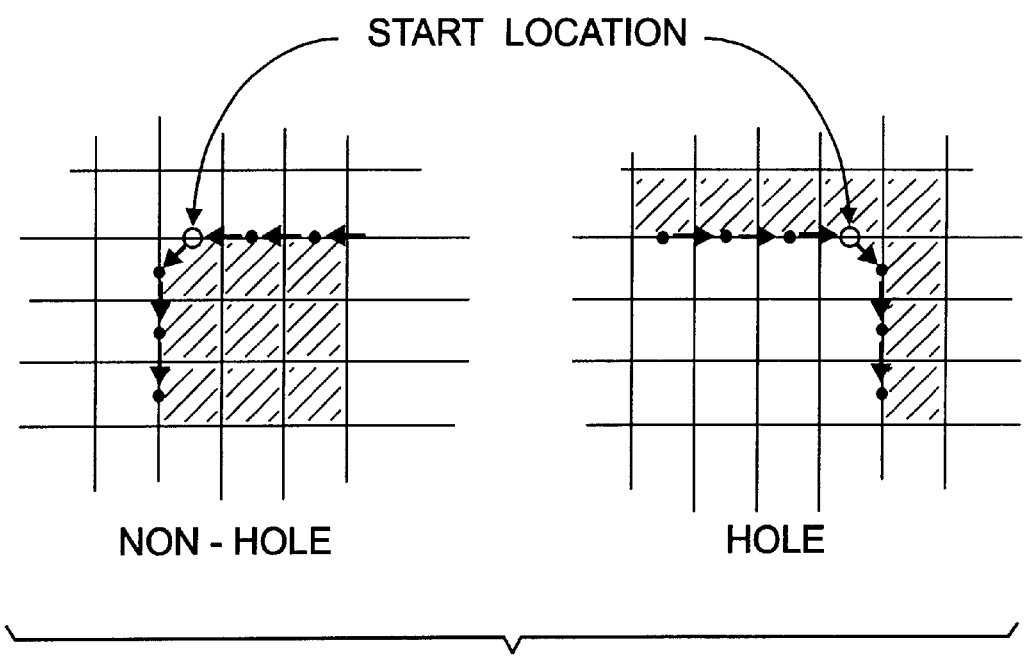

The initial step is therefore to perform boundary contour tracing. As shown in FIGS. 4(*a*)–(*c*), every connected component in the image is represented by its starting point and the succession of 8-way direction changes necessary to traverse its boundary. Mid-crack encoding notes explicitly the midpoints on boundaries between white and black pixels. One advantage of a mid-crack contour representation is that it encodes the traversal of one pixel wide figures without having to retrace pixels. (FIG. 4(*a*)). The bounding contour of a binary figure is represented by a mid-crack chain code. For each contour, this consists of a starting point and a set of direction codes. A boundary contour's starting point is on the horizontal boundary above the first white/black pixel boundary encountered when scanning the bitmap in raster fashion beginning from the upper left corner, as shown in FIG. 4(*b*). The subsequent chain code tells how to proceed along the contour in steps whose directions are encoded according to the representation of FIG. 4(*c*). For example, the chain code for the contour shown in FIG. 4(*a*) is { . . . 6, 7, 7, 6, 6, 6, 7, 1, 2, 2, 1, 1, 1, 0 . . . }.

After the tracing is completed, connected components are classified as being CHARACTER type objects or non-character type objects (stroke or blob) on the basis of statistics that are gathered from the boundary contour as it is traversed in the manner noted above. These statistics include: (1) bounding box width and height obtained from the minimum and maximum horizontal and vertical extent of the contour; (2) contour perimeter; (3) area enclosed by the bounding contour (computed via any well-known contour integral); and, (4) contour wiggliness.

In order to maintain independence of scanning resolution, which impacts character size, features (2) and (3) are combined into a Perimeter-Area Ratio (par) according to the following formula, $$par = \frac{p^2}{4\pi A} \tag{1}$$

where p is the perimeter and A is the area enclosed.

Figure 5:
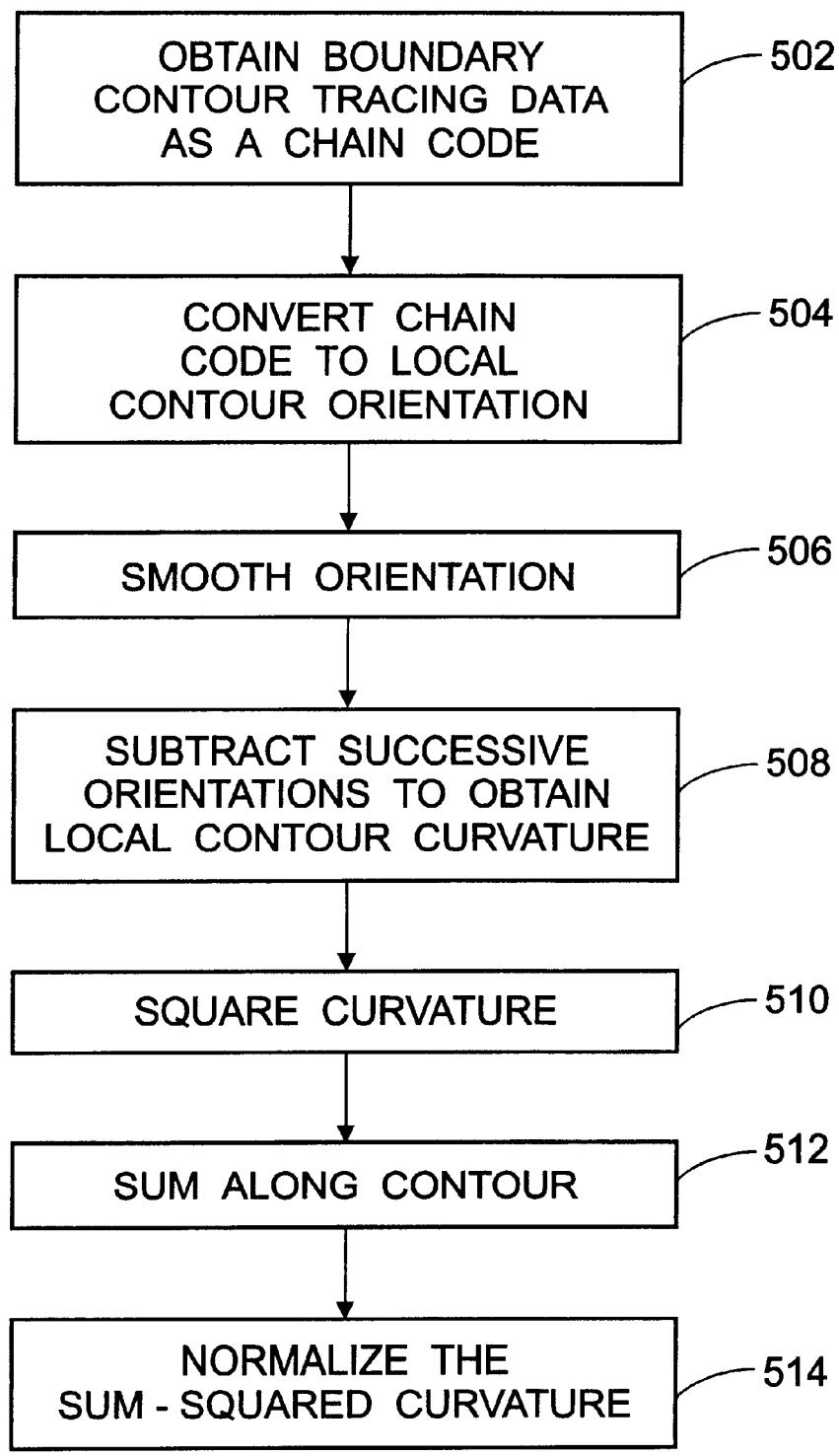
FIG. 5 is a flowchart of a process to determine wiggliness.

Measurement of features (1) through (3) may be accomplished in any manner apparent to those skilled in the art. Feature (4) (contour wiggliness) is measured as follows. Referring to FIG. 5, at each point along the contour, encoded direction steps of the chain code are obtained (step 502) as described above and converted to a local contour orientation (step 504). Next, the orientation is causally smoothed by exponential smoothing (step 506) and successive orientations are subtracted to get local contour curvature (step 508). The curvature is then squared and summed along the contour (steps 510 and 512). Finally, the sum-squared curvature is normalized by contour length to arrive at an average squared curvature which measures average "wiggliness" versus straightness of the contour (step 514).

The above noted features are combined according to predetermined decision criteria to arrive at a final classification of each connected component as being a character object or not. The decision criteria is a simple boolean combination of thresholds on the various features. These criteria, of course, will vary depending on the needs and desires of the user, as those skilled in the art will appreciate. Alternatively, a standard neural network classifier may be used to classify. Such a network can flexibly trade off the various feature measures. Note that this filtering procedure does not take account of holes inside objects' bounding contours, and contours representing holes are not used in the classification procedure.

Figure 6:
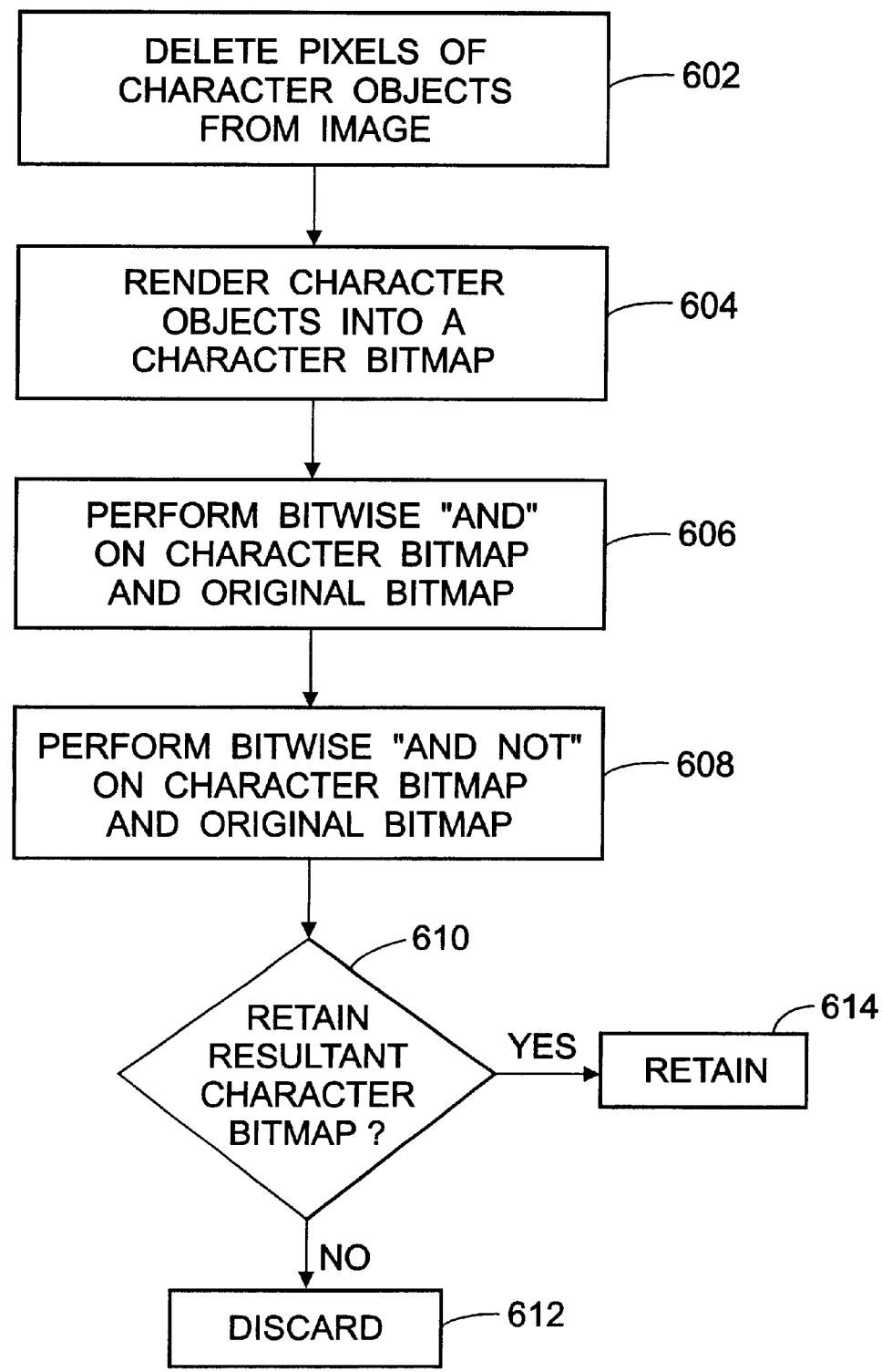
FIG. 6 is a flowchart of character separation according to the present invention.

Referring back to FIG. 3 (step 304), each time a connected component is classified as a character object, its pixels are deleted from the image. As more particularly described in connection with FIG. 6, this is done by rendering the deleted object into a separate character bitmap by coloring pixels black along its contour, then performing raster-based coloring (steps 602 and 604). This character bitmap is then bitwise ANDed with the original image to whiten pixels corresponding to holes in the object (step 606). Finally, the character bitmap is combined with the original image using a bitwise AND NOT operation to remove its black pixels from the original image (step 608). The character bitmap can be either discarded (steps 610 and 612) or retained (steps 610 and 614) to perform OCR or to maintain in bitmap form a representation of the character objects as represented by step 308 of FIG. 3.

Figure 7:
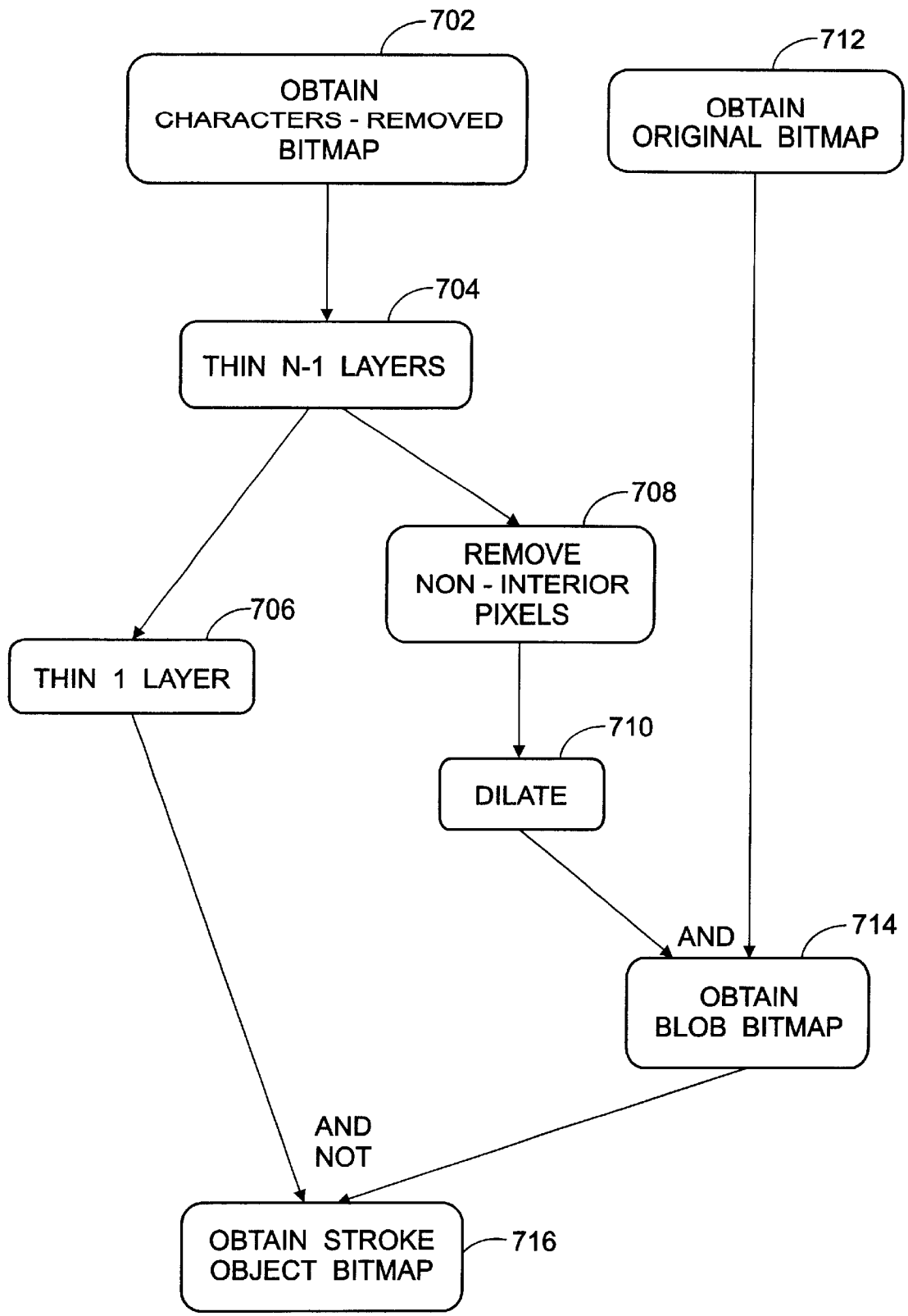
FIG. 7 is a flowchart of stroke/blob separation according to the present invention.

After all character objects have been removed from the image, as shown in FIG. 7, the next step (step 306 of FIG. 3) is to separate (thin) stroke type image objects from (thick) blobular image objects, even where the two types of objects might touch. The strategy for stroke/blob separation is to detect relatively thin objects and remove these from the image, leaving behind thick objects. It is, of course, desirable to do this without unduly corrupting the shapes of the objects.

First, a bitmap having all characters removed is obtained (as described above) (step 702). Then, N−1 contour-based thinning steps are performed (step 704), where N is the threshold number of thinning steps used to distinguish thin from thick objects. The resultant bitmap is then copied so that another contour-based thinning operation can be applied to the resultant image (step 706) and an image morphology operation (to remove all non-interior pixels) can be performed on the copy (step 708). An image morphology-based dilation to restore pixels eroded away by thinning is also performed (step 710).

Thinning may be accomplished in a variety of manners. Preferably, thinning will be accomplished as described below. This process of thinning in the context of skeletonization of figures in an image is described in the above-identified, concurrently filed application to the same inventor (U.S. application Ser. No. 09/200,187, entitled "Method and Apparatus for Extracting the Skeleton of a Binary Figure by Contour-Based Erosion"), which is incorporated herein by reference. However, other processes such as morphological erosion or a thinning algorithm such as the one described in F. Y. Shih and W-T. Wong, "A New Safe-Point Thinning Algorithm Based on the Mid-Crack Code Tracing," *IEEE Trans. on Systems. Man. and Cybernetics*, Vol. 25, No. 2, pp. 370–378 (February 1995), may be implemented. Of course, utilizing methods other than the preferred method may require alterations to the method that should be apparent to those of skill in the art and may render different results in terms of precision, accuracy, and efficiency.

Figure 8:
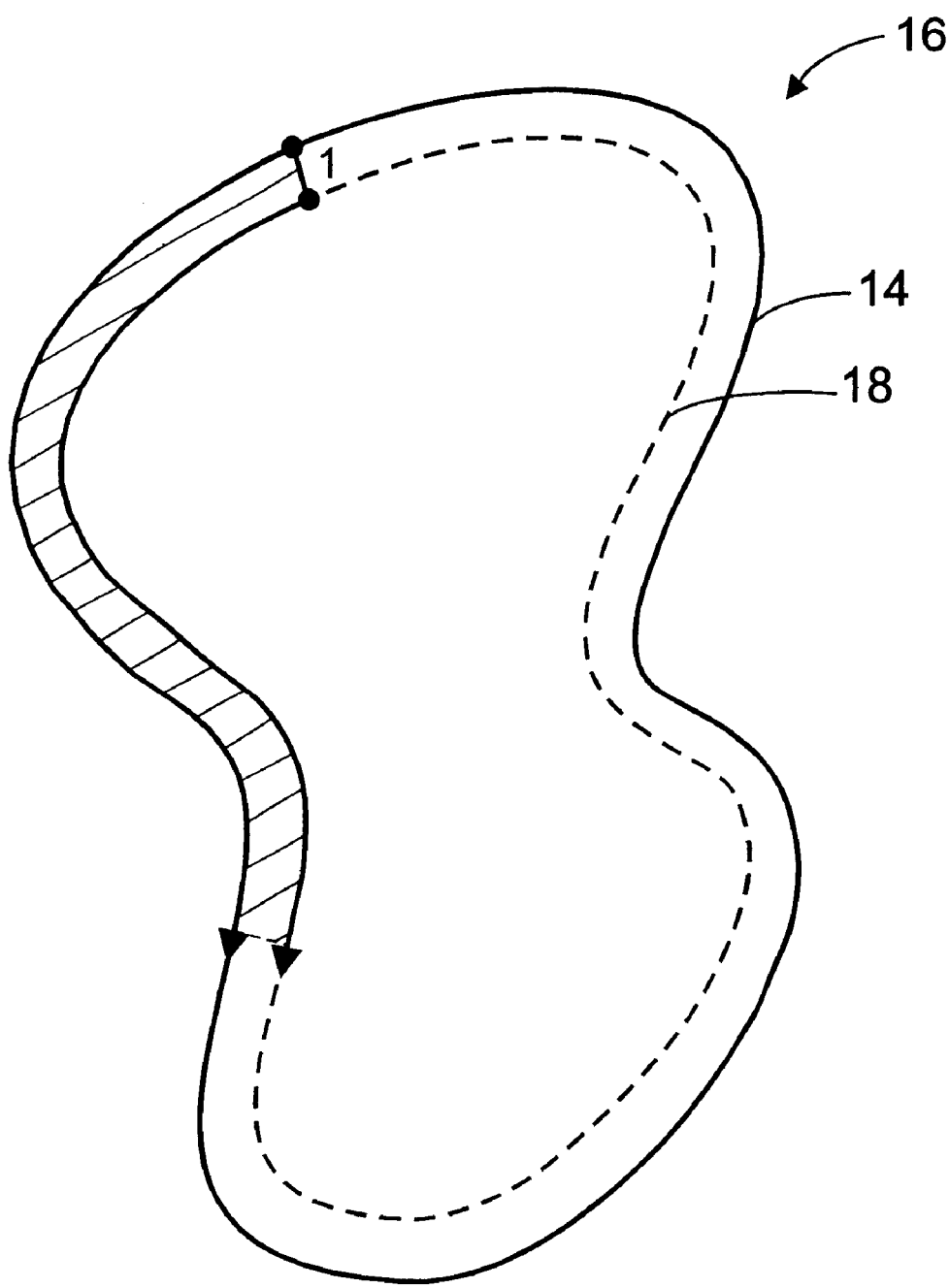
FIG. 8 shows a representative explanatory figure for boundary-based thinning.

As to preferred technique for thinning, the chain codes previously generated are used along with rules stored in look-up table(s). As shown in FIG. 8, it is to be appreciated that when following the chain code of the boundary contour 14 in the direction of the arrows, black pixels (not all shown but which may comprise the FIG. 16) on the perimeter of the figure always occur on the left in an exemplary dark-on-light image. This suggests that thinning, to establish a new boundary, or target, 18, can be performed simply by proceeding along the contour 14 and placing a new boundary contour 18 one pixel to the left of the existing boundary contour 14. In order to implement this idea, the quantized boundary contour chain code of a digitized binary image or figure will preferably reflect this convention but provisions must be made for determining when a section of the figure, or image, 16 is sufficiently thin so the new, or target, contour 18 cannot be moved inward further but must instead overlie the existing contour.

The step of displacing the boundary contour one pixel inward is preferably implemented by building a lookup table of path displacement rules or cases, and identifying target path locations for the new boundary path using these predetermined rules. For each case shown in FIGS. 9(a)–9(i), the current path location along the existing, or current, boundary contour is encircled. Also shown, as indices into the table, are the directions into and out of the current path location according to (he current boundary chain code. Each entry in the table lists 0, 1, 2, or 3 target locations for the new boundary path.

Note that FIGS. 9(a)–9(i) only show the table entries for incoming directions 0 and 1. Incoming directions 2 through 7 are generalized from these by rotation, as those of skill in the art will appreciate. More particularly, the rules or cases involving incoming tracing directions 2, 4 or 6 are illustrated simply by rotating FIGS. 9(a)–(c) so that the incoming directions 2, 4 and 6 align with the illustrated incoming direction 0. Likewise, the rules or cases involving incoming tracing directions 3, 5, or 7 are illustrated simply by rotating FIGS. 9(d)–(i) so that the incoming directions 3, 5, and 7 align with the illustrated incoming direction 1.

The path displacement rules also specify which black pixel in the bitmap may be colored white as a result of displacing the boundary contour inward one pixel. These are indicated by a circled X.

A condition for the new target path to be displaced one pixel inward from the current path is that the target path remain a boundary between a white (background) pixel and black (figure) pixel. To ensure this condition, each case of FIGS. 9(a)–9(i) also indicates with a question mark nearby pixels that need to be tested (to make sure they are black) in order to displace the path inward. If any of these nearby pixels are not black, the target path location must instead be set to be coincident with the current path location.

As more particularly shown in FIGS. 9(a)–9(i), circled points indicate a current location along the existing contour path. Arrows indicate incoming and outgoing directions relative to the current trace location. As noted above, question marks indicate pixels that must be black in order for the contour to be displaced at this path location. In the description that follows (and throughout the entire description) the direction conventions illustrated in FIG. 4(c) are used for case of reference.

If the contour is to be displaced (i.e. thinning is to occur at this location), a circled X denotes a subject pixel (which is black for purposes or this description) to be flipped to white, and squares indicate target locations for the new thinned boundary path. If thinning does not occur at this location, the target path location is taken to be the current location indicated by the circled point.

Figure 9A:
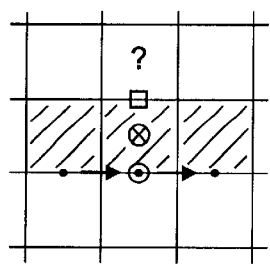
FIGS. 9(*a*)–9(*i*) illustrate path displacement rules.

As shown, FIG. 9(a) indicates that when the incoming and outgoing trace directions are 0, the subject pixel is directly above the current location, and the pixels in the directions 0 and 4 relative to the subject pixel are black, the pixel in the direction 2 relative to the subject pixel is tested to determine whether it is black. If the tested pixel is black, then the subject pixel is turned to white and the target path location is established on the opposite side of the subject pixel as shown.

Figure 9B:
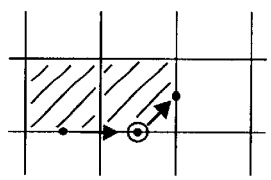

FIG. 9(b) shows an incoming direction 0, an outgoing direction 1, a black pixel directly above the current location of the tracing, and a black pixel in the direction 4 relative to the pixel above the current location. In this case, no alterations of pixels or target path are accomplished.

Figure 9C:
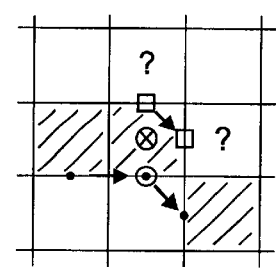

FIG. 9(c) shows an incoming direction 0, an outgoing direction 7, the subject pixel being directly above the current trace location, and black pixels ill the directions 4 and 7 relative to the subject pixel. In this case, the pixels in the directions 2 and 0 relative to the subject pixel are tested to determine if such pixels are black. If these pixels are black, the subject pixel is changed to white and the target path altered so that two target path locations border the subject pixel and the tested pixels.

Figure 9D:
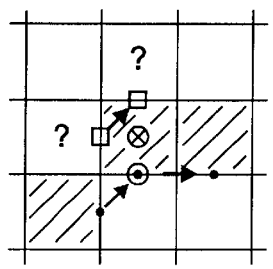

FIG. 9(d) shows an incoming direction 1, an outgoing direction 0, a subject pixel directly above the current trace location, and black pixels in the 5 and 0 directions relative to the subject pixel. In this situation, the pixels in the direction 4 and 2 relative to the subject pixel are tested to determine if such pixels are black. If these pixels are black, the subject pixel is changed to white and two new target path locations are established between the subject pixel and each tested pixel.

Figure 9E:
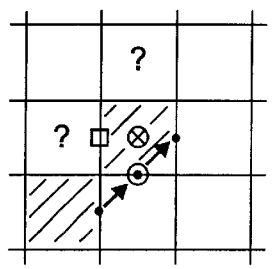

FIG. 9(e) shows incoming and outgoing directions 1, a subject pixel directly above the current trace location, and a neighboring black pixel in the direction 5 relative to the subject pixel. The pixels in the directions 4 and 2 relative to the subject pixel are tested to determine it such pixels are black. If they are black, the subject pixel is changed to white and a new target path location is established on the border between the subject pixel and the pixel in the direction 4 relative to the subject pixel.

Figure 9F:
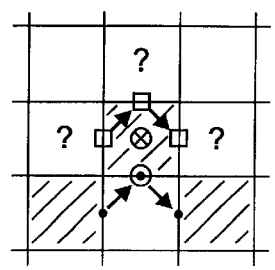

FIG. 9(f) illustrates an incoming direction of 1, an outgoing direction of 7, a subject pixel directly above the current trace location, and black pixels in the directions 5 and 7 relative to the subject pixel. In this case, the pixels in the directions 4, 2, and 0 relative to the subject pixel are tested to determine if such pixels are black. If these pixels are black, the subject pixel is changed to white and three new target path locations are established on the borders of the subject pixel and each tested pixel.

Figure 9G:
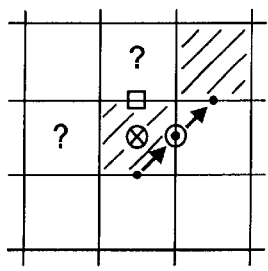

With reference to FIG. 9(g), an incoming direction 1, an outgoing direction 1, a subject pixel to the direct left of the current trace location, and a black pixel in the direction 1 relative to the subject pixel, are illustrated. In this case, pixels in the directions 4 and 2 relative to the subject pixel are tested to determine if they are black. If these pixels are black, the subject pixel is converted to white and a new target path location is established between the subject pixel and the pixel in the direction 2 relative to the subject pixel.

Figure 9H:
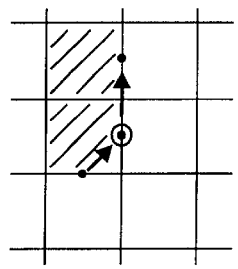

FIG. 9(h) shows a case where the incoming direction is 1, the outgoing direction is 2, the pixel directly to the left of the current trace location is black, and the pixel directly above that pixel is also black. In this case, no pixels are converted and the path is not altered.

Figure 9I:
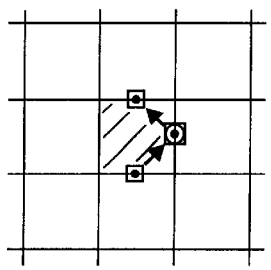

In FIG. 9(i), the incoming direction is 1, the outgoing direction is 3, and a single pixel to the left of the current trace location is black. In this case, no pixels are converted and the target path locations are maintained on all but the left side of the black pixel.

So, as the method traverses along the existing boundary contour, it flips black pixels along the perimeter to white and identifies, or re-encodes, target locations for the new, or target, boundary contour, all according to the path displacement rules. Once one or more new target path locations have been established by the application of a path displacement rule, the method links with previously identified locations on the new path. Because of the complex geometry of non-straight contours and because sonic of the Path Displacement rules are not able to specify any target path locations with the information available locally, these links may require the placement of as many as four intermediate mid-crack locations on the new boundary contour.

Figure 10A:
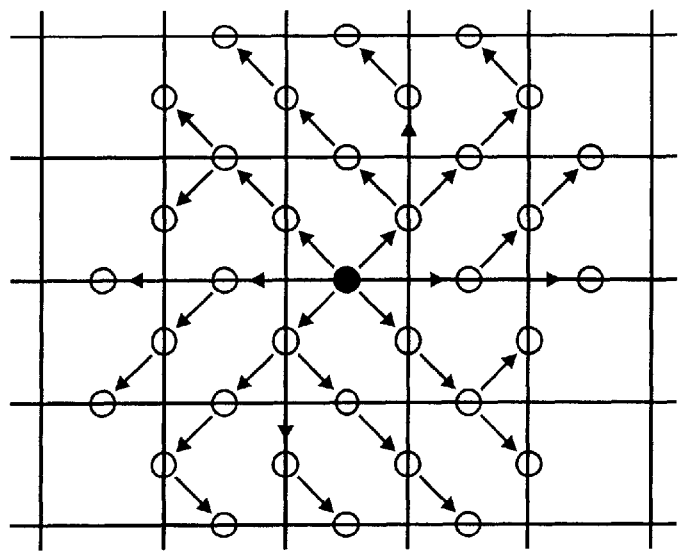
FIGS. 10(*a*) and 10(*b*) illustrates path extension rules.
Figure 10B:
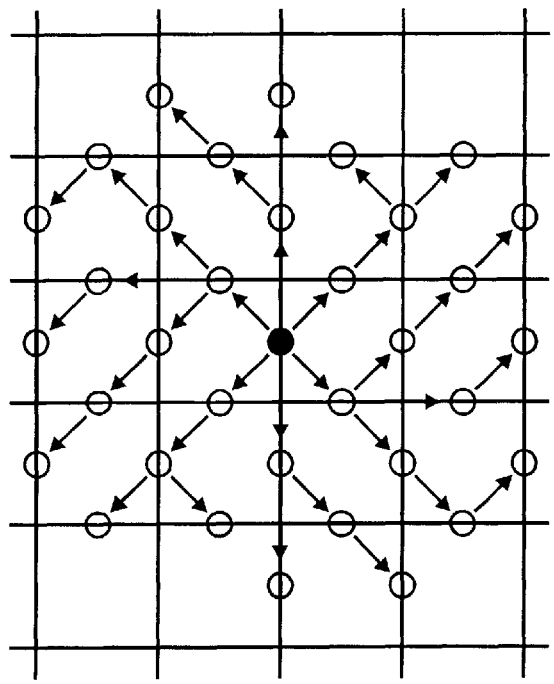

As a result, a set of path extension rules dictate how to extend a new boundary contour. These are shown in FIGS. 10(a)–10(b) where arrows indicate intermediate mid-crack steps to connect the last accepted location in an evolving boundary path (dot) with various possible locations of the next target location (circles). These path extension rules define paths between last known positions on a target curve and new target positions based on the current rule.

A few exceptional situations arise in which the local geometry of a figure demands special rules to ensure proper thinning behavior. These are cataloged in FIGS. 11(a)–11(g). As shown, exceptional conditions occur under certain extended contour paths as indicated by dark arrows, or when certain pixels are black as indicated by question marks. FIG. 11(a) shows a modification to the rule of FIG. 9(g) wherein the pixel with the crossed out question mark (in the direction 4 relative to the subject pixel) need not be black in order for thinning to occur. Note that the path segment prior to the incoming segment is in the direction 0 and the pixel in the direction 1 relative to the subject pixel is not black. FIG. 11(b) shows a modification to the rule of FIG. 9(h) wherein the black subject pixel to the immediate left of the current trace position is flipped to white. Note that the path segment prior to the incoming segment is in the direction 0. FIG. 11(c) shows another modification to the rule of FIG. 9(h) wherein the black subject pixel to the immediate left of the current path location is flipped to white, and a new path target location is placed as shown by the square on the top border of the subject pixel. This modification to rule 9(h) applies only if the proposed target position indicated by the square is ½ pixel distance in both the x and y directions from the last target position, as indicated by the triangle. Also note that the pixels in the directions 4 and 3 relative to the subject pixel are black and the path starting at point P and ending at the current location is defined by the code {6, 7, 0, 1}. FIG. 11(d) shows a modification to the rule of FIG. 9(c) wherein the black subject pixel may be flipped to white, a new path location is placed as shown by the square (between the subject pixel and the tested pixel), and the current location on the existing path is advanced to the location shown by the triangle—to the right of the pixel in the direction 3 relative to the subject pixel. As illustrated, the pixel in the direction 3 relative to the subject pixel is black and only the pixel in the direction 4 relative to the subject pixel needs to be tested. If it is black, the subject pixel is turned to white and the target path attained. FIG. 11(e) shows a modification to the rule of FIG. 9(i) wherein no target positions for the new path are specified at this step. Note that the path segment just prior to the incoming segment is in the direction 7. FIG. 11(f) shows a modification to the rule of FIG. 9(b) wherein if the path is as shown by the arrows (i.e. 5, 5, 6, 7, 0 from P to the current path location) and the pixel indicated by the square (upper right of quadrant) is white, the location on the path indicated by the smaller square—which is also the current path location—should be taken as a target location for the new path and the extension rules applied. FIG. 11(g) shows a modification to the rule of FIG. 9(h), whereby three black pixels are flipped to white and the target location established between the rightmost pixels of the defined quadrant of pixels. The pixel to the immediate left of the current location (the subject pixel) and the pixels in the directions 4 and 3 relative to the subject pixel comprise these three black pixels. The pixel in the direction 2 relative to the subject pixel is initially white and the path from point P to the current location is {5, 6, 7, 0, 1}.

It should be noted that at the beginning of the thinning process, a catalog of starting cases must be consulted in order to bootstrap the thinning process so that the normal path displacement rules and the path extension rules can apply. There is one catalog of starting cases for shrinking black figures on a white background, and another catalog for expanding holes. These are shown in FIGS. 12(a)–12(o) and 13(a)–13(d).

As shown in FIGS. 12(a)–12(o), a catalog of 15 starting configurations for non-hole figures (black figures on white background) is established. In FIGS. 13(a)–13(d), a catalog of 4 configurations for boundary contours representing white holes in black figures is likewise established. In each case, thick black lines indicate the original contour path of the image in the vicinity of the beginning or start location of the boundary contour. Dashed lines indicate a disjunction of possible starting paths for this catalog entry. Hatched pixels and pixels containing an empty square indicate a condition that this pixel must be black or white, respectively, to satisfy this start configuration. Therefore, these pixels must be tested. Circles indicate the initial path of the new boundary contour. Squares indicate initial locations along the old contour from which to begin applying Path Displacement Rules. "XF" indicates that this pixel should be flipped to white immediately. "XL" indicates that this pixel should be flipped to white after the boundary contour has been traversed.

Specifically, FIGS. 12(a)–12(o) illustrate starting configurations for non-hole figures. Accordingly, it should be recognized that only certain pixels (marked as described above) will be tested according to selected configurations to determine if such pixels are black or white. Otherwise, although not so marked, it should be understood that pixels to the left of the boundary contour shown, as the contour is traversed in a counter-clockwise direction, are black and those to the right are white in the original image. It should be further understood that the original to boundary contour chain codes noted below begin at the starting location S identified in the drawings.

Referring now to FIG. 12(a), when the original boundary contour has the chain code {5, 6 . . . 3} beginning and ending at the starting location S, the initial path of the new boundary contour, beginning at the same starting location, is {5, 6}. At the terminal point of this new boundary contour, indicated by the square in the figure, the path displacement rules noted above are applied.

Referring to FIG. 12(b), when the original boundary contour has the chain code {5, 5 . . . 3, 3} and the pixel below the pixel having the starting location on its border is determined to be black, the pixel having the starting location on its border is immediately changed to a white pixel and the initial target path location is moved to be between the changed pixel and the tested black pixel. The initial path of the new boundary contour has the code (4) beginning at the new initial target path location. At that terminal location of the new initial path, indicated by the square in the drawing, the path extension rules are applied.

Referring now to FIG. 12(c), when the original boundary contour has the chain code {5, 5, 5 . . . 3}, the initial path for the new boundary contour has the chain code {5, 5} from the same starting location and the path displacement rules are then applied at the location indicated by the square.

Referring now to FIG. 12(d), when the original boundary contour has the chain code {5, 7, 7, 7, (1, 0 or 7) . . . }, the original path is taken as the initial path for the new boundary contour (i.e. {5, 7, 7, 7, (1, 0, or 7)}) and the path displacement rules are applied beginning at the location having the incoming direction specified by the (1, 0, or 7) noted in the chain code above.

FIG. 12(e) shows a figure having the chain code {5, 7, 0, (1, 0 or 7) . . . }. In this case, the initial path of the new boundary contour has the chain code {5, 7, 0, (1, 0 or 7)} with the path displacement rules being initiated at the end of the path identified by this chain code.

FIG. 12(f) shows a starting configuration having the original contour with the chain code {5, 6 . . . 4}. As shown, if pixels $P_1$ and $P_2$ are black, the pixel above pixel $P_1$ is changed to white and the initial path of the new boundary contour is established to have locations on the top and left side borders of $P_1$. After the thinning pass is completed, the pixel in the direction 3 relative to pixel $P_1$ is also changed to black. In this configuration, the path displacement rules are initiated on the left border of the pixel above $P_2$.

FIG. 12(g) shows an original boundary contour having the chain code {5, 6 . . . 4} and a white pixel $P_1$ in the lower right portion of the illustrated quadrant. Under these conditions, the initial path of the new boundary contour starts one pixel length in the direction 0 from the original starting position S and has the code {5, 5, 5}. The location where this chain code terminates is thus where the path displacement rules are initiated. After the boundary is traversed, the pixel in the direction 3 relative to $P_1$ is changed to white.

Referring now to FIG. 12(h), an original boundary contour having the code {5, 5 . . . 4} and black pixels $P_1$, $P_2$ and $P_3$, are shown. Under these circumstances, the initial path of the new boundary contour starts one pixel length directly below the original starting location and has the code {5, 3}. The path displacement rules are then initiated at the location indicated by the square. After the boundary is traversed, the pixel in the direction 2 relative to $P_2$ is changed to white.

FIG. 12(i) shows an original boundary contour having the chain code {5, 5, (4 or 5) . . . 4} and a white pixel $P_1$ directly below the pixel having the starting location on its top border. In this configuration, the initial path for the new boundary contour has the code {5, 5, (4 or 5)}. Path displacement rules are thus initiated at the terminal point of that path, as shown by the alternate squares.

FIG. 12(j) illustrates an original boundary contour having the code {5, 5 . . . 4}, a black pixel $P_1$ and a white pixel $P_2$. In this environment, the pixel above $P_1$ is changed to white and the initial path of the new boundary is begun one pixel length in the direction 0 relative to the original starting location using the code {5, 5, 4}. The path displacement rules are then initiated.

FIG. 12(k) shows an initial boundary contour having the code {5, 5 . . . 3}. In this situation, the initial path of the new boundary contour is the same as the initial path of the original boundary contour. That is, the new path has the code {5, 5}. The path displacement rules are then initiated.

FIG. 12(l) shows an original boundary contour having the code {5, 7, 7, (5 or 6) . . . }. In this situation, the initial path for the new boundary contour before the path displacement rules are applied is {5, 7, 7, (5 or 6)}.

FIG. 12(m) includes an illustration of a boundary contour having an original code of {5, 5, (4 or 5) . . . 3, 3} and a white pixel $P_1$ located one pixel length below the starting location S. In this case, the initial boundary path for the new boundary is {5, 5, (4 or 5)}.

FIG. 12(n) illustrates an original boundary contour having the code {5, 5 . . . 4}, white pixel $P_1$ and black pixels $P_2$ and $P_3$. In this case, the initial boundary path is selected to begin one pixel length below the original starting location and has the chain code of {4} before the path displacement rules are applied. It should be further noted that in this configuration, the pixel directly below the starting location is immediately turned to black.

Referring now to FIG. 12(o), an original boundary contour having the code {5, 6 . . . 4}, white pixel $P_1$ and black pixel $P_2$ are shown. In this configuration, the starting location for the initial path for the new boundary contour is placed on the upper boundary of pixel $P_2$. The initial path thus has the code {4, 5}. The path displacement rules are initiated at the terminal point of that code. It should also be noted that the pixel marked XF is immediately changed to a white pixel while the pixel marked XL is changed to a white pixel after the boundary contour has been traversed.

As noted above, FIGS. 13(a) through 13(d) illustrate starting configurations for boundary contours representing white holes in black figures. As such, although notations are generally similar to FIGS. 12(a)–12(o), it should be recognized that pixels to the left of the boundary contour, as the boundary contour is traversed in the clockwise direction, are black while pixels to the right are white.

Figure 13A:
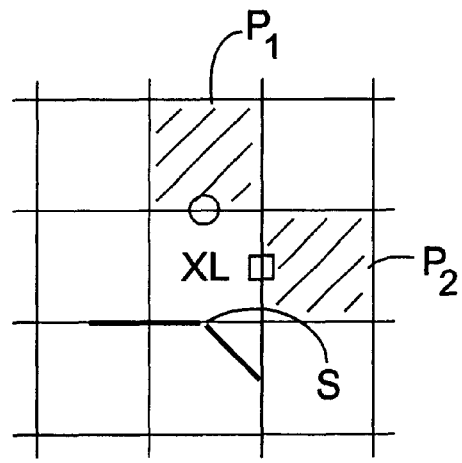
FIGS. 13(*a*)–13(*d*) illustrate a catalog of configurations for boundary contours representing white holes and black figures.

Referring now to FIG. 13(a), the boundary chain code for the original boundary contour is {7 . . . 0}. In this configuration, pixels $P_1$ and $P_2$ are black. If these conditions are met, the starting point of the initial path for the new boundary contour is moved one pixel length directly above the original starting location (on the lower border of pixel $P_1$) and the initial direction of the path is in the direction 7. The path displacement rules are then initiated. It should also be noted that the pixel between the black pixel $P_1$ and the original starting location is changed to a black pixel after the boundary contour has been traversed.

Figure 13B:
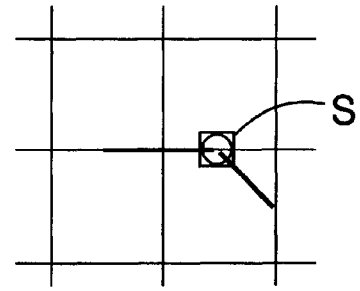

Referring to FIG. 13(b), an original boundary contour having the code {7 . . . 0} is shown. In this case, the same boundary contour is maintained and the path displacement rules are applied at the original starting point.

Figure 13C:
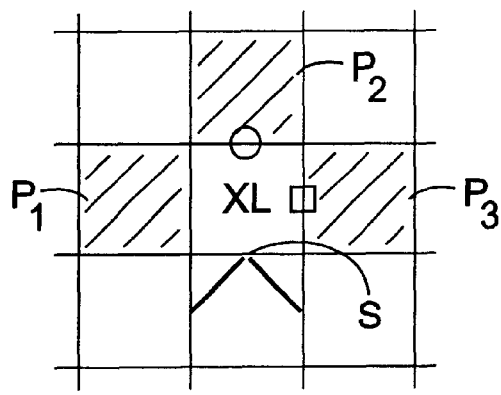

Referring to FIG. 13(c), the original contour has the code {7 . . . 1} and pixels $P_1$, $P_2$ and $P_3$ are black. In this configuration, the starting location for the initial path for the new boundary contour is established on the lower border of pixel $P_2$ and, before the path displacement rules are applied, tracing is advanced in the direction 7 relative to the new starting point. It should also be noted that the pixel designated XL, between the original and new starting locations, is changed to a white pixel after the boundary contour has been traversed.

Figure 13D:
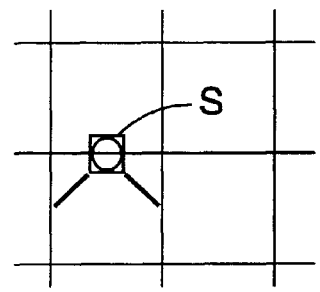

With respect to FIG. 13(d), an original boundary contour having the code {7 . . . 1} is shown. In this case, the path displacement rules are implied at the original starting position.

At the conclusion of a thinning pass around a contour, the process terminates when the last position in the current chain code curve is reached. The following are modifications (shown in FIGS. 14(a)–(b)) to the normal stopping condition which involve interposing one additional intermediate target position for the new curve. In the figures, arrows indicate direction of last path link in the original chain code curve. A circle indicates the first point on the path in new chain code curve. A triangle indicates a last target position on new chain code curve. It should be recognized that multiple triangles on the diagrams indicate alternative last target positions. A square indicates an intermediate target position on new chain code curve to which a path extension rule is applied.

Figure 14A:
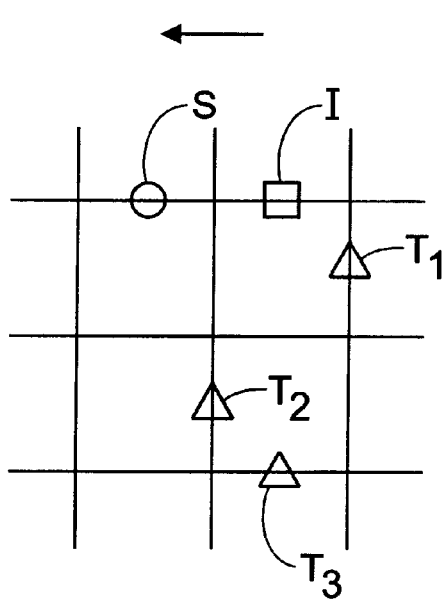
FIGS. 14(*a*)–14(*b*) illustrate stopping cases.
Figure 14B:
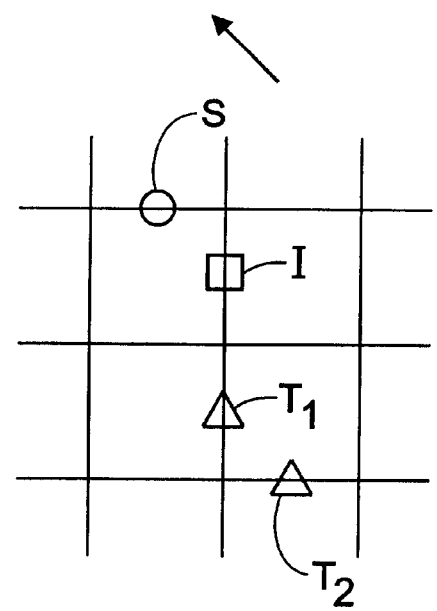

Referring to FIG. 14(a), if the first point on the new chain code curve is at position S, and the last target position is located at either position $T_1$, $T_2$, or $T_3$, an intermediate target position 1 is established. Likewise, referring now to FIG. 14(b), if the starting position of the new chain code is as shown at S, and the last target position is $T_1$ or $T_2$, then the intermediate target position 1 is established. These special stopping cases are necessary to avoid undesired new boundary paths.

If the mid-crack encoded contour is 8 pixels in length or shorter, a simple lookup table is consulted to determine the boundary path and remaining black pixels of the final figure. This is shown in FIGS. 15(a)–15(i) where a catalog of 9 configurations of boundary contours equal to 8 pixels in length. The circled X indicates a pixel to delete, or change to white. Figures shorter than 8 pixels are already considered thinned.

Referring to the figures, the boundary contours shown are illustratively designated to be contours for non-holes for ease of description. Of course, it is to be appreciated that this aspect of the invention could be applied to non-holes as well. In addition, the chain codes listed were determined by traversing the boundary beginning at the starting location S.

Figure 15A:
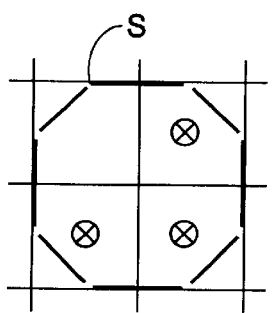
FIGS. 15(*a*)–15(*i*) illustrate a catalog of nine configurations of boundary contours equal to 8 mid-crack steps in length; and, FIG. 16 is a block diagram of a system implementing the present invention.

As shown, the chain code for the contour of FIG. 15(a), beginning at the starting point S, is {5, 6, 7, 0, 1, 2, 3, 4}. In this configuration, all but the upper left pixel of the quadrant of pixels are changed from black to white, or deleted.

Figure 15B:
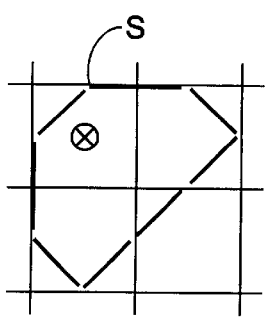

FIG. 15(b) has a chain code of {5, 6, 7, 1, 1, 1, 3, 4}. In this case, the upper left pixel of the four pixels that are traversed by the boundary is deleted.

Figure 15C:
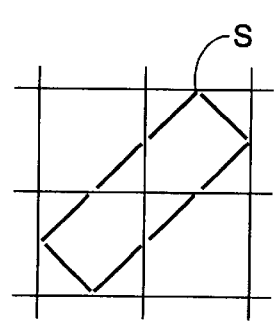

In FIG. 15(c), the boundary is represented by the chain code {5, 5, 5, 7, 1, 1, 1, 3}. No pixels are deleted in this configuration.

Figure 15D:
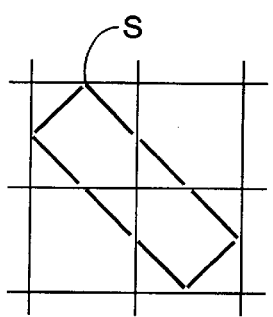

As shown at FIG. 15(d), the chain code is {5, 7, 7, 7, 1, 3, 3, 3}. Again, no pixels are deleted in this configuration.

Figure 15E:
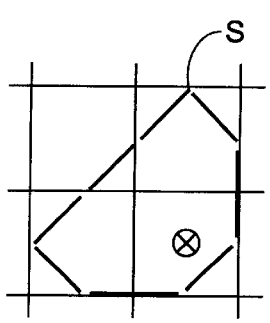

FIG. 15(e) illustrates a chain code of {5, 5, 5, 7, 0, 1, 2, 3}. Only the bottom right pixel of the four traversed pixels is changed to black.

Figure 15F:
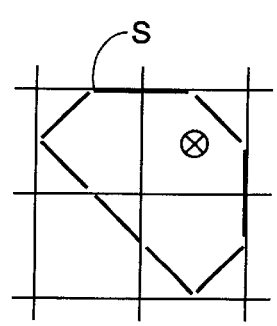

FIG. 15(f) shows a contour with the chain code {5, 7, 7, 7, 1, 2, 3, 4}. In this case, the upper right pixel of the quadrant of pixels traversed is changed to white.

Figure 15G:
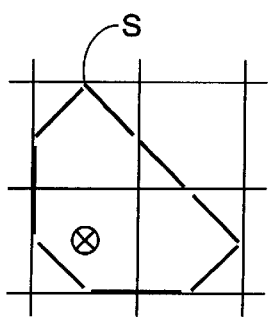

FIG. 15(g) illustrates the chain code {5, 6, 7, 0, 1, 3, 3, 3}. In this case, the bottom left pixel of the quadrant traversed is changed to white.

Figure 15H:
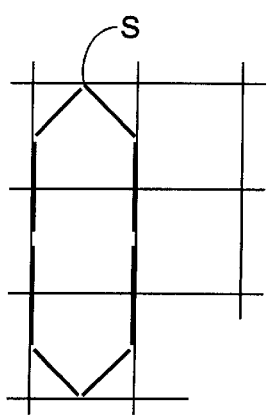

FIG. 15(h) shows a contour with a chain code of {5, 6, 6, 7, 1, 2, 2, 3}. No pixels are converted in this configuration.

Figure 15I:
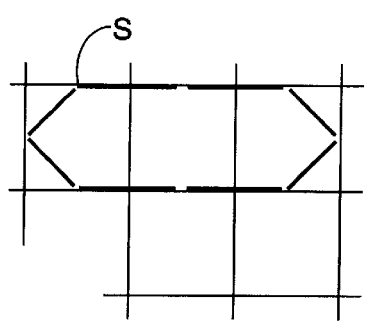

FIG. 15(i) illustrates a contour having a chain code of {5, 7, 0, 0, 1, 3, 4, 4}. Again, no pixels are converted if this configuration is encountered.

Referring back now to FIG. 7, after the original image bitmap is obtained (step 712), a bitwise AND operation is performed between the original image and dilated bitmap of step 710 to trim excess pixels around thick shapes resulting from dilation (step 714). This results in a blob bitmap that can be processed as shown by(step 312 of FIG. 3).

A bitwise AND NOT is then performed between blob-bitmap and the bitmap resulting from step 706 to remove thick objects (step 716). A tracing operation is also applied to the resultant bitmap to collect chain-coded skeleton representations of curvilinear objects. This results in the stroke object bitmap that can be processed as shown by (step 310 of FIG. 3).

Figure 16:
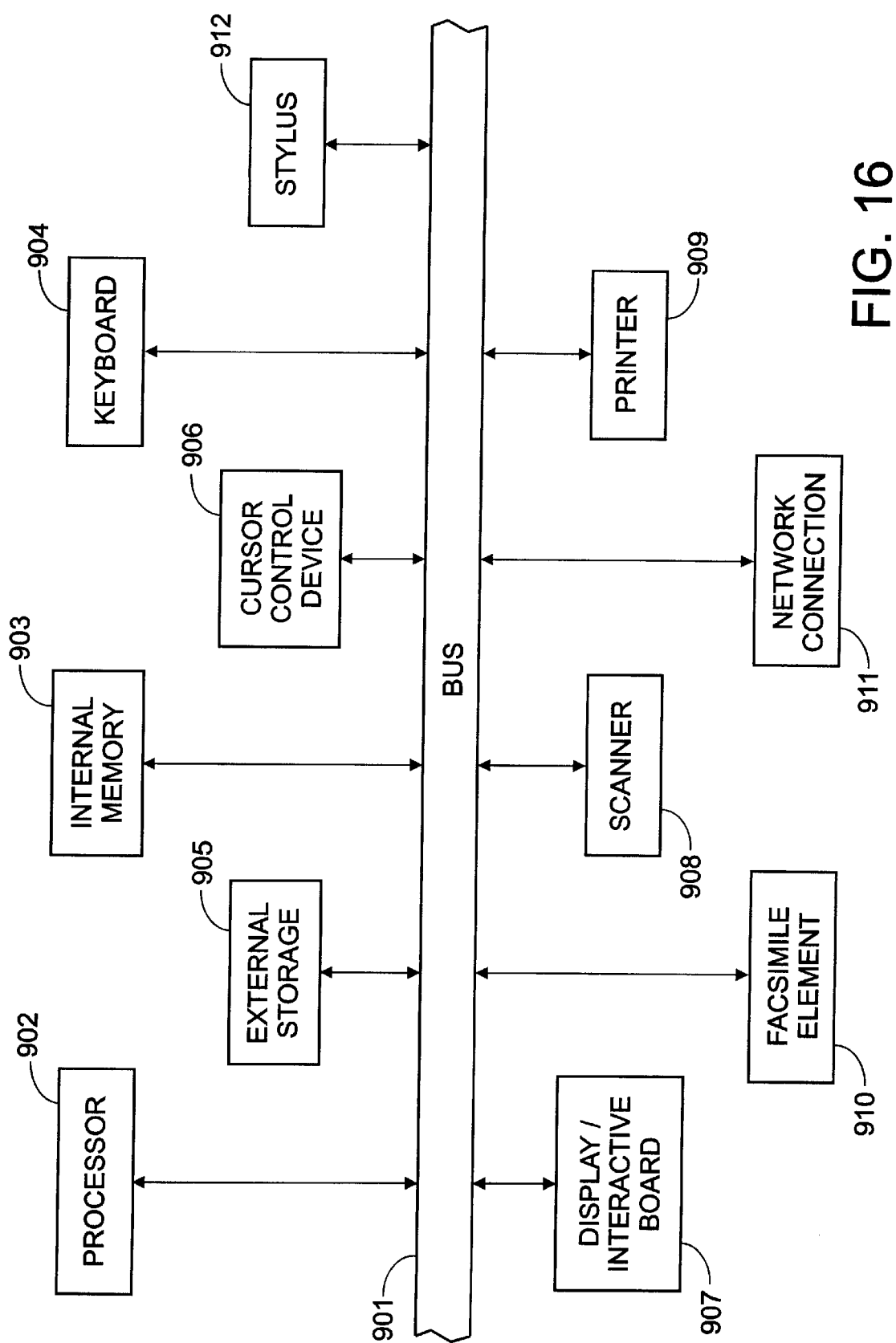

An exemplary computer based system on which the currently preferred embodiment of the present invention may be used is described with reference to FIG. 16. As shown, the computer based system is comprised of a plurality of components coupled via bus 901. The bus 901 illustrated here is simplified in order not to obscure the present invention. The bus 901 may consist of a plurality of parallel buses (e.g. address, data and status buses) as well as a hierarchy of buses (e.g. a processor bus, a local bus and an I/O bus). In any event, the computer system is further comprised of a processor 902 for executing instructions provided via bus 901 from Internal memory 903 (note that the Internal memory 903 is typically a combination of Random Access or Read Only Memories). Such instructions are those that are preferably implemented in software for carrying out the processing steps outlined above in connection with of FIGS. 1–15(i). The processor 902 and Internal memory 903 may be discrete components or a single integrated device such as an Application Specification Integrated Circuit (ASIC) chip. Further the combination of processor 902 and Internal Memory 903 comprise circuitry for the performing the functionality of the present invention.

Also coupled to the bus 901 are a keyboard 904 for entering alphanumeric input, external storage 905 for storing data such as a compressed text image data file, a cursor control device 906 for manipulating a cursor, a stylus 912, and a display 907 for displaying visual output. The display 907 in the context of the present invention may include an electronic interactive display board as discussed above. The keyboard 904 would typically be a standard QWERTY keyboard but may also be a telephonelike keypad. The external storage 905 may be fixed or removable magnetic or optical disk drive. The cursor control device 906 will typically have a button or switch associated with it to which the performance of certain functions can be programmed. Further coupled to the bus 901 is a scanner 908. The scanner 908 provides a means for creating a bit mapped representation of a medium (i.e. a scanned document image).

Optional elements that could be coupled to the bus 901 would include printer 909, facsimile clement 910 and network connection 911. The printer 909 could be used to print the bitmapping representation. The facsimile element 910 may contain an clement used to transmit a image data that has been compressed using the present invention. Alternatively, the facsimile element 910 could include an element for decompression of a document image compressed using the present invention. The network connection 911 would be used to receive and/or transmit data containing image data. Thus, the image data utilized by the present invention may be obtained through a scanning process, via a received fax or over a network.

The above description merely provides a disclosure of particular embodiments of the invention and is not intended for the purpose of limiting the same thereto. As such, the invention is not limited to only the above described embodiments. Rather, it is recognized that one skilled in the art could conceive alternative embodiments that fall within the scope of the invention.

Having thus described the invention, I hereby claim:

1. A method for separating types of objects present in an image, the method comprising steps of:
    a) inputting the image having objects including character type objects stroke type objects and blob type objects;
    b) generating a first bitmap representing the image;
    c) determining which of the objects of the image are of the character type by comparing predetermined decision criteria to data obtained from the first bitmap by:
        i) performing boundary contour tracing on the objects represented in the first bitmap to obtain a contour of each of the objects,
        ii) measuring a width and height of each contour based on a boundary box thereof,
        iii) measuring a perimeter of the each contour,
        iv) measuring an area of the each contour,
        v) determining a ratio of the perimeter to the area for the each contour, and
        vi) measuring a wiggliness of the each contour;
    d) separating character type objects from the first bitmap to obtain a second bitmap, having only characters represented therein, and a third bitmap;
    e) performing N−1 thinning steps on the third bitmap to obtain a fourth bitmap;
    f) copying the fourth bitnmap to obtain a fifth bitmap;
    g) performing another thinning step on the fourth bitmap;
    h) removing all non-interior pixels of the fifth bitmap to obtain a sixth bitmap;
    i) performing an image morphology based dilation on the sixth bitmap to restore pixels eroded by the thinning and removing steps and obtain a seventh bitmap;
    j) performing a bitwise boolean operation between the first bitmap and the seventh bitmap to obtain an eighth bitmap having only blob type objects represented therein;
    k) performing a bitwise boolean operation between the fourth bitmap and the eighth bitmap to obtain a ninth bitmap; and,
    l) performing a tracing operation on the ninth bitmap to obtain a tenth bitmap having only stroke type objects represented therein.

2. The method as set forth in claim 1 wherein the boolean operation of step j) is an AND operation.

3. The method as set forth in claim 1 wherein the boolean operation of step k) is an AND NOT operation.

4. The method as set forth in claim 1 further comprising obtaining a representation of the character type objects based on the second bitmap.

5. The method as set forth in claim 1 wherein the obtaining of the second bitmap comprises copying the separated character objects to a separate bitmap and performing boolean operations between the first bitmap and the separate bitmap.

6. The method as set forth in claim 1 further comprising obtaining a representation of the blob type objects based on the eighth bitmap.

7. The method as set forth in claim 1 further comprising obtaining a representation of the stroke type objects based on the tenth bitmap.

8. The method as set forth in claim 1 wherein the wiggliness of each contour is determined based on a sum-squared curvature of the contour.

9. A method for separating types of objects present in an image, the method comprising steps of:
   a) inputting the image having objects including character type objects, stroke type objects and blob type objects;
   b) generating a first bitmap representing the image;
   c) determining which of the objects of the image are of the character type by comparing predetermined decision criteria to data obtained from the first bitmap;
   d) separating character type objects from the first bitmap to obtain a second bitmap, having only characters represented therein, and a third bitmap;
   e) performing N−1 thinning steps on the third bitmap to obtain a fourth bitmap;
   f) copying the fourth bitmap to obtain a fifth bitmap;
   g) performing another thinning step on the fourth bitmap;
   h) removing all non-interior pixels of the fifth bitmap to obtain a sixth bitmap;
   i) performing an image morphology based dilation on the sixth bitmap to restore pixels eroded by the thinning and removing steps and obtain a seventh bitmap;
   j) performing a bitwise boolean operation between the first bitmap and the seventh bitmap to obtain an eighth bitmap having only blob type objects represented therein;
   k) performing a bitwise boolean operation between the fourth bitmap and the eighth bitmap to obtain a ninth bitmap; and,
   l) performing a tracing operation on the ninth bitmap to obtain a tenth bitmap having only stroke type objects represented therein.

10. The method as set forth in claim 9 wherein the boolean operation of step j) is an AND operation.

11. The method as set forth in claim 9 wherein the boolean operation of step k) is an AND NOT operation.

12. The method as set forth in claim 9 further comprising obtaining a representation of the character type objects based on the second bitmap.

13. The method as set forth in claim 9 wherein the obtaining of the second bitmap comprises copying the separated character objects to a separate bitmap and performing boolean operations between the first bitmap and the separate bitmap.

14. The method as set forth in claim 9 further comprising obtaining a representation of the blob type objects based on the eighth bitmap.

15. The method as set forth in claim 9 further comprising obtaining a representation of the stroke type objects based on the tenth bitmap.

16. The method as set forth in claim 9 wherein step c) comprises
   i) performing boundary contour tracing on the objects represented in the first bitmap to obtain a contour of each of the objects,
   ii) measuring a width and height of each contour based on a boundary box thereof,
   iii) measuring a perimeter of the each contour,
   iv) measuring an area of the each contour,
   v) determining a ratio of the perimeter to the area for the each contour, and
   vi) measuring a wiggliness of the each contour.

17. The method as set forth in claim 16 wherein the wiggliness of each contour is determined based on a sum-squared curvature of the contour.

18. A method for separating types of objects present in an image, the method comprising steps of:
   a) inputting the image having objects including character type objects, stroke type objects and blob type objects;
   b) generating a first bitmap representing the image;
   c) determining which of the objects of the image are of the character type by comparing predetermined decision criteria to data obtained from the first bitmap;
   d) separating character type objects from the first bitmap to obtain a second bitmap, having only characters represented therein, and a third bitmap; and,
   e) separating stroke type objects and blob type objects of the image, respectively, by selectively using techniques of thinning, dilation, and bitwise logical operations on at least one of the first and third bitmaps.

19. The method as set forth in claim 18 wherein step c) comprises:
   f) performing N−1 thinning steps on the third bitmap to obtain a fourth bitmap;
   g) copying the fourth bitmap to obtain a fifth bitmap;
   h) performing another thinning step on the fourth bitmap;
   i) removing all non-interior pixels of the fifth bitmap to obtain a sixth bitmap;
   j) performing an image morphology based dilation on the sixth bitmap to restore pixels eroded by the thinning and removing steps and obtain a seventh bitmap;
   k) performing a bitwise boolean operation between the first bitmap and the seventh bitmap to obtain an eighth bitmap having only blob type objects represented therein;
   l) performing a bitwise boolean operation between the fourth bitmap and the eighth bitmap to obtain a ninth bitmap; and,
   m) performing a tracing operation on the ninth bitmap to obtain a tenth bitmap having only stroke type objects represented therein.

20. A system for separating types of objects present in an input image having character type objects, stroke type objects and blob type objects, the system comprising:
   means for generating a first bitmap representing the image;
   means for determining which of the objects of the image are of the character type by comparing predetermined decision criteria to data obtained from the first bitmap;
   means for separating character type objects from the first bitmap to obtain a second bitmap, having only characters represented therein, and a third bitmap; and,
   means for separating stroke type objects and blob type objects of the image, respectively, by selectively using techniques of thinning, dilation, and bitwise logical operations on at least one of the first and third bitmaps.

21. The system as set forth in claim 20 wherein the means for separating stroke type objects and blob type objects comprises means for 1) performing N−1 thinning steps on the third bitmap to obtain a fourth bitmap, 2) copying the fourth bitmap to obtain a fifth bitmap, 3) performing another thinning step on the fourth bitmap, 4) removing all non-interior pixels of the fifth bitmap to obtain a sixth bitmap, 5) performing an image morphology based dilation on the sixth bitmap to restore pixels eroded by the thinning and removing steps and obtain a seventh bitmap, 6) performing a bitwise boolean operation between the first bitmap and the seventh bitmap to obtain an eighth bitmap having only blob type objects represented therein, 7) performing a bitwise boolean operation between the fourth bitmap and the eighth bitmap to obtain a ninth bitmap and 8) performing a tracing operation on the ninth bitmap to obtain a tenth bitmap having only stroke type objects represented therein.

22. The system as set forth in claim 20 wherein the means for determining comprises means for 1) performing boundary contour tracing on the objects represented in the first bitmap to obtain a contour tracing on the objects represented in the first bitmap to obtain a contour of each of the objects, 2) measuring a width and height of each contour based on a boundary box thereof, 3) measuring a perimeter of the each contour, 4) measuring an area of the each contour, 5) determining a ratio of the perimeter to the area for the each contour and 6) measuring a wiggliness of the each contour.

* * * * *